(12) United States Patent
Ubhayakar et al.

(10) Patent No.: US 11,796,158 B2
(45) Date of Patent: Oct. 24, 2023

(54) LAMP UNIT HOUSING AND A LAMP ARRANGEMENT

(71) Applicant: VOLVO TRUCK CORPORATION, Gothenburg (SE)

(72) Inventors: Chinmay Ubhayakar, Bangaluru (IN); Akshay Natarajan, Chennai (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/597,490

(22) PCT Filed: Jun. 23, 2020

(86) PCT No.: PCT/EP2020/067482
§ 371 (c)(1),
(2) Date: Jan. 7, 2022

(87) PCT Pub. No.: WO2021/004777
PCT Pub. Date: Jan. 14, 2021

(65) Prior Publication Data
US 2022/0282854 A1 Sep. 8, 2022

(30) Foreign Application Priority Data

Jul. 10, 2019 (IN) .............................. 201941027670

(51) Int. Cl.
*F21V 17/18* (2006.01)
*F21V 15/01* (2006.01)
*F21V 23/06* (2006.01)

(52) U.S. Cl.
CPC .............. *F21V 17/18* (2013.01); *F21V 15/01* (2013.01); *F21V 23/06* (2013.01)

(58) Field of Classification Search
CPC .......... F21V 17/18; F21V 15/01; F21V 23/06; B60Q 2800/20; B60Q 1/0441
See application file for complete search history.

(56) References Cited

U.S. PATENT DOCUMENTS

| 3,185,835 A | * | 5/1965 | Muller | .................. | F21V 17/162 |
| | | | | | 362/225 |
| 3,525,544 A | * | 8/1970 | Jacobs | .................. | F21V 17/162 |
| | | | | | 362/451 |

(Continued)

FOREIGN PATENT DOCUMENTS

| DE | 102010010414 A1 | 9/2011 |
| EP | 0466034 A1 | 1/1992 |

(Continued)

OTHER PUBLICATIONS

International Search Report and Written Opinion dated Sep. 15, 2020 in corresponding International PCT Application No. PCT/EP2020/067482, 10 pages.

*Primary Examiner* — Tsion Tumebo
(74) *Attorney, Agent, or Firm* — Venable LLP; Jeffri A. Kaminski (57) ABSTRACT

The disclosure relates to a lamp unit housing (100) and a lamp arrangement (1) for a vehicle (2), the lamp unit housing being adapted to receive and lock a lamp unit (10) in a housing space of the lamp unit housing, the lamp unit housing comprising: —a first interior surface (101) and a second interior surface (102) at least partly defining the housing space, wherein the first and second interior surfaces are facing each other inside the housing space, —a first clamping means (103) and a second clamping means (104), wherein the first clamping means is provided proximate the first interior surface and the second clamping means is provided proximate the second interior surface, and wherein each one of the first and second clamping means is moveable between an unlocking position for unlocking the lamp unit from the lamp unit housing and a locking position for locking the lamp unit to the lamp unit housing, —a synchronization member (111) connecting the first and the second clamping means, whereby the synchronization mem- (Continued)

ber synchronizes the movement of the first and the second clamping means between the unlocking position and the locking position.

12 Claims, 5 Drawing Sheets (56) References Cited

U.S. PATENT DOCUMENTS

| | | | | |
|---|---|---|---|---|
| 3,700,887 | A * | 10/1972 | Marx | F21V 17/162 |
| | | | | 362/225 |
| 3,983,387 | A * | 9/1976 | Van Steenhoven | F21V 31/00 |
| | | | | 362/375 |
| 4,385,345 | A | 5/1983 | Freudenreich et al. | |
| 5,803,578 | A | 9/1998 | Madsen | |
| 6,264,348 | B1 * | 7/2001 | Ellis | F21S 8/04 |
| | | | | 362/374 |
| 2002/0131272 | A1 * | 9/2002 | Berne | B60Q 1/0064 |
| | | | | 362/419 |
| 2017/0196068 | A1 * | 7/2017 | Castillo | H05B 47/19 |
| 2019/0017693 | A1 * | 1/2019 | Ebner | B60Q 1/0483 |
| 2019/0118699 | A1 * | 4/2019 | Wu | B60Q 1/076 |
| 2019/0257481 | A1 * | 8/2019 | Patel | F21V 17/107 |

FOREIGN PATENT DOCUMENTS

| | | | |
|---|---|---|---|
| EP | 1088701 | A1 | 4/2001 |
| FR | 2793872 | A1 | 11/2000 |

* cited by examiner

LAMP UNIT HOUSING AND A LAMP ARRANGEMENT

CROSS-REFERENCE TO RELATED APPLICATIONS

This application is a U.S. National Stage application of PCT/EP2020/067482, filed Jun. 23, 2020, and published on Jan. 14, 2021, as WO 2021/004777 A1, all of which is hereby incorporated by reference in its entirety.

TECHNICAL FIELD

The invention relates to a lamp unit housing for a vehicle, a lamp arrangement for a vehicle and/or to a vehicle comprising the lamp unit housing or the lamp arrangement.

The invention can be applied in heavy-duty vehicles, such as trucks, buses and construction equipment. Although the invention will be described with respect to heavy-duty trucks, the invention is not restricted to this particular vehicle, but may also be used in other vehicles such as light-weight trucks, articulated haulers, excavators, wheel loaders, and backhoe loaders.

BACKGROUND

A lamp unit for a vehicle, such as a headlamp provided at the front of the vehicle for illuminating the road ahead, may be mountable into a lamp unit housing which is provided on the vehicle.

An example of a headlamp which is mounted in a lamp unit housing can be found in the patent application with no. DE 4021255 A1. The headlamp as disclosed therein is fitted in a recess of the housing and is retained therein by a catch.

Even though there are headlamp units which are retained in lamp unit housings on the vehicle without e.g. the need of separate fasteners, such as screws etc., there is still a strive of developing improved headlamps and lamp unit housings which are robust and easy to mount/dismount, especially for larger and heavier headlamps, such as headlamps for trucks.

SUMMARY

In view of the above, an object of the invention is to provide an improved, more robust lamp unit housing and/or lamp arrangement for a vehicle which at least in some aspect alleviates at least one of the drawbacks of the prior art, and/or which provides a good alternative.

According to a first aspect, the object is achieved by a lamp unit housing for a vehicle. According to a second aspect, the object is achieved by a lamp arrangement. According to a third aspect, the object is achieved by a vehicle.

According to the first aspect of the invention, the object is achieved by a lamp unit housing for a vehicle, the lamp unit housing being adapted to receive and lock a lamp unit in a housing space of the lamp unit housing, the lamp unit housing comprising:
- a first interior surface and a second interior surface at least partly defining the housing space, wherein the first and second interior surfaces are facing each other inside the housing space,
- a first clamping means and a second clamping means, wherein the first clamping means is provided proximate the first interior surface and the second clamping means is provided proximate the second interior surface, and wherein each one of the first and second clamping means is moveable between an unlocking position for unlocking the lamp unit from the lamp unit housing and a locking position for locking the lamp unit to the lamp unit housing,
- a synchronization member connecting the first and the second clamping means, whereby the synchronization member synchronizes the movement of the first and the second clamping means between the unlocking position and the locking position.

By the provision of the lamp unit housing as disclosed herein, a lamp unit may be retained therein in an improved manner. More particularly, by having two clamping means, which are provided on opposite sides of the housing space, a more robust retaining function is achieved, which is especially advantageous when the retained lamp unit is heavy and/or large. Furthermore, the inventors have realized that providing a synchronization member which synchronizes the movement of the clamping means further improves the robustness of the connection to the lamp unit housing. The synchronized movement of the clamping means may facilitate mounting of the lamp unit, allowing the clamping means to move synchronized to the unlocking position. Thereby, the risk that one of the clamping means does not move to the unlocking position during the mounting procedure will be reduced or prevented. In a similar manner, the risk that one of the clamping means does not move to the locking position when the lamp unit is mounted will be reduced or prevented. Furthermore, when the lamp unit is dismounted from the lamp unit housing, the synchronized movement of the clamping means may reduce the time for dismounting the lamp unit. In addition, the synchronized movement may also allow a user to dismount the lamp unit by only accessing the lamp unit housing from one side thereof, i.e. only at one of the sides where one of the clamping means is located.

Optionally, each one of the first and second clamping means may further be biased towards the locking position by at least one biasing member, such as a spring. This may further facilitate mounting/dismounting of the lamp unit in that the biasing member may e.g. support in providing a plug and play configuration, i.e. a configuration requiring fewer manual operations by a user. In fact, by use of the biasing member, the locking may be completely, or at least partially, achieved automatically by only providing the lamp unit into the housing space.

Optionally, the lamp unit housing may further comprise a bottom interior surface further defining the housing space and facing an opening of the housing space. Still optionally, the synchronization member may extend between the first and the second interior surface inside the housing space and preferably proximate the bottom interior surface. This may provide more space for the lamp unit when mounted in the housing space. Further, providing the synchronization member inside the housing space proximate the bottom interior surface may also be beneficial due to that the synchronization member thereby will be protected by the bottom interior surface of the housing space. Hence, the risk of damaging the synchronization member, for example before mounting the lamp unit housing to the vehicle, may thereby be reduced.

Optionally, the bottom interior surface may comprise one or more push biasing member/s which is/are adapted to provide a pressing force onto the lamp unit when it is mounted in the housing space and locked to the lamp unit housing by the first and the second clamping means. Thereby the lamp unit may more easily be released from the lamp unit housing during dismounting.

Optionally, the lamp unit housing may further comprise a clamping means moving member which is connected to at least one of the first and the second clamping means, wherein the clamping means moving member is adapted to move the first and the second clamping means between the unlocking position and the locking position. The clamping means moving member is preferably manually actuated by a user, and since the clamping means' movement is synchronized, it may suffice to only have a clamping means moving member on one side of the lamp unit housing. Thereby, dismounting, and also mounting, can be facilitated, especially when it is difficult to reach and get access to both sides of the lamp unit housing which comprises the clamping means. In fact, the lamp unit housing may be provided on the vehicle so that it is difficult to access all sides thereof, and therefore it is beneficial if the mounting/dismounting operation by a user can be performed by only accessing one side of the lamp unit housing.

Optionally, the clamping means moving member may be provided outside the housing space proximate the first interior surface and be connected to the first clamping means, wherein the lamp unit housing further comprises a guide, such as a slot, which at least a portion of the clamping means moving member is adapted to be connected to and slide in when it moves the first and the second clamping means between the unlocking position and the locking position. Thereby, the clamping means moving member may move in and follow a predetermined path which will ensure that it moves in a repeated manner between the locking and unlocking position. Hence, this configuration may improve the reliability of the lamp unit connection.

Optionally, the guide may extend between a proximal end and a distal end, wherein the proximal end is located proximate the first clamping means and the distal end is located distal from the first clamping means, whereby the portion of the clamping means moving member is adapted to be movable at the distal end of the guide between a first position where the clamping means moving member locks the first and the second clamping means into the locking position and a second position where the clamping means moving member is freely moveable in the guide. This may provide a more rigid locking of the first and second clamping means since a first movement of the portion is required from the first position to the second position before the clamping means moving member can be freely moveable in the guide. The first movement of the portion from the first position to the second position is preferably provided in a direction which is angled relative to the direction of the movement of the portion in the guide. Hence, for unlocking the lamp unit, a user may need to at least move the portion in two different directions. For example, the direction of the movement of the portion between the first and second positions may be substantially perpendicular to the direction of the movement of the portion in the guide.

Still optionally, the portion of the clamping means moving member may be biased towards its first position by a second biasing member, such as a spring. Preferably, the biasing member is configured so that a user has to provide a force onto the clamping means moving member for moving the portion from the first position to the second position, which force is equal to or larger than a predetermined threshold value.

Optionally, the lamp unit housing may further comprise a fourth and a fifth interior surface further defining the housing space, facing each other and extending between the respective first and second interior surface, wherein at least one of the fourth and fifth interior surfaces comprises one or more lamp unit guides into which the lamp unit can slide when it is mounted into and released out from the housing space. Thereby, the lamp unit housing may more easily be inserted into and pulled out from the housing space, with a reduced risk of the lamp unit getting stuck. Further, the one or more guides may facilitate to position the lamp unit correctly with respect to the housing space.

Optionally, the lamp unit housing may further comprise an electrical connection for electrically connecting the lamp unit to the lamp unit housing, wherein preferably the electrical connection is provided on the bottom interior surface as mentioned in the above. Still further, the electrical connection is preferably configured so that it will automatically connect to a corresponding electrical connection on the lamp unit when the lamp unit is provided into its locked position in the lamp unit housing. The electrical connection may be an electrical power connection and/or a connection for communication between the vehicle and the lamp unit.

According to the second aspect of the invention, the object is achieved by a lamp arrangement comprising the lamp unit housing according to any one of the embodiments of the first aspect of the invention and a lamp unit comprising means for emitting light. The lamp unit comprises a first exterior surface and a second exterior surface facing away from each other, wherein the first interior surface and the first exterior surface are adapted to face each other when the lamp unit is mounted in the housing space and wherein the second interior surface and the second exterior surface are adapted to face each other when the lamp unit is mounted in the housing space, wherein the first exterior surface comprises a first locking means being adapted to be locked to the housing by the first clamping means when the first clamping means is in its locking position and wherein the second exterior surface comprises a second locking means being adapted to be locked to the housing by the second clamping means when the second clamping means is in its locking position.

Advantages and effects provided by the second aspect of the invention are largely analogous to the advantages and effects as provided by the lamp unit housing according to the embodiments of the first aspect of the invention. It shall also be noted that all embodiments of the second aspect of the invention are applicable to and combinable with all embodiments of the first aspect of the invention and vice versa.

The means for emitting light provided on the lamp unit may be any kind of light source, such as any kind of light source which produces light from electrical current, e.g. preferably LED (light-emitting diode) lights, but also it may be halogen lights, incandescent lights etc.

Optionally, the lamp arrangement may further comprise means for wireless power transfer and/or wireless communication for the lamp unit. The means for wireless power transfer and/or wireless communication may be provided on the lamp unit housing according to the first aspect of the invention, but it may also be provided on any other location on the vehicle, however preferably proximate the location of the lamp unit housing, when mounted thereto. Wireless power transfer may for example be provided by electromagnetic induction. Wireless communication may be provided by any kind of wireless communication technique, such as by WiFi™, Bluetooth® etc. The wireless communication may for example be used for activating/deactivating the means for emitting light, adjusting the light emitting direction of the means for emitting light, adjusting the light strength of the means for emitting light etc.

Optionally, the lamp arrangement may be a headlamp arrangement for illuminating a road ahead of the vehicle when in use.

According to the third aspect of the invention, the object is achieved by a vehicle comprising the lamp unit housing according to any one of the embodiments of the first aspect of the invention or the lamp arrangement according to any one of the embodiments of the second aspect of the invention.

Advantages and effects provided by the third aspect of the invention are largely analogous to the advantages and effects as provided by the lamp unit housing according to the embodiments of the first aspect of the invention and the lamp arrangement according to the embodiments of the second aspect of the invention. It shall also be noted that all embodiments of the first and second aspects of the invention are applicable to and combinable with all embodiments of the third aspect of the invention and vice versa.

BRIEF DESCRIPTION OF THE DRAWINGS

With reference to the appended drawings, below follows a more detailed description of embodiments of the invention cited as examples.

In the drawings.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

Figure 1:
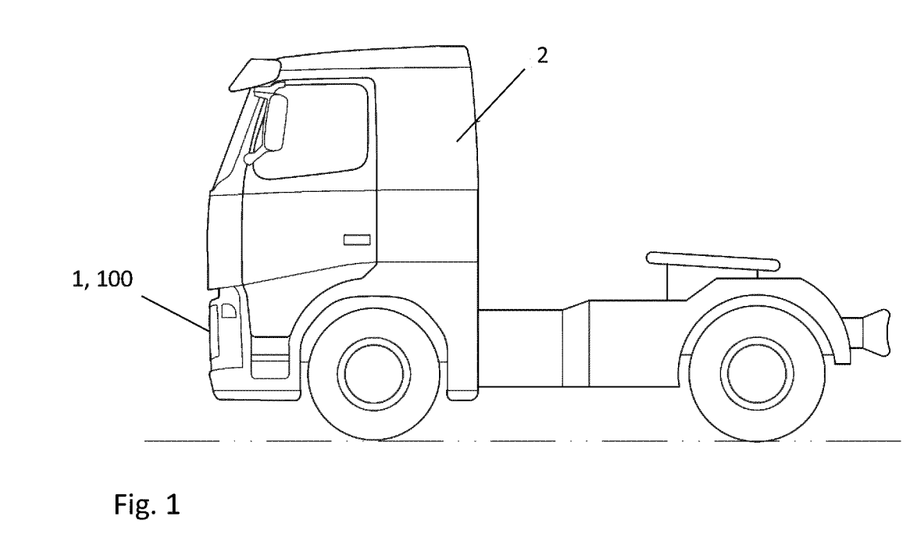
FIG. 1 shows an example embodiment of a vehicle according to the third aspect of the present invention.

With respect to FIG. 1, a vehicle 2 according to the third aspect of the invention is shown. The vehicle comprises a lamp unit housing 100 and a lamp arrangement 1 according to the first and second aspects of the present invention. The vehicle 2 is here a towing truck. However, the invention is not restricted to this type of vehicle, but may be applicable to any other type of vehicle, such any other type of heavy duty truck, a bus, a construction equipment vehicle or the like. The present invention has however shown to be especially advantageous for larger vehicles requiring larger and heavier lamp units. The lamp arrangement 1 is here a headlamp of the vehicle 2 provided at the front thereof.

Figure 2A:
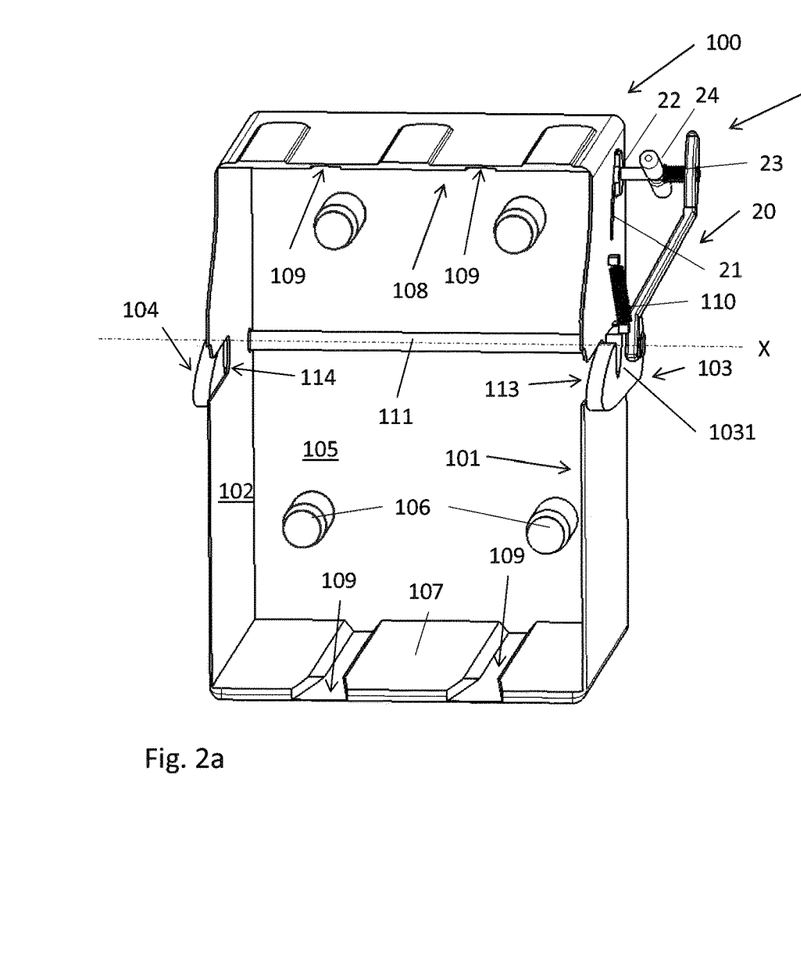
FIGS. 2a and 2b show example embodiments of a lamp unit housing and a lamp unit according to the first and second aspects of the present invention.
Figure 2B:
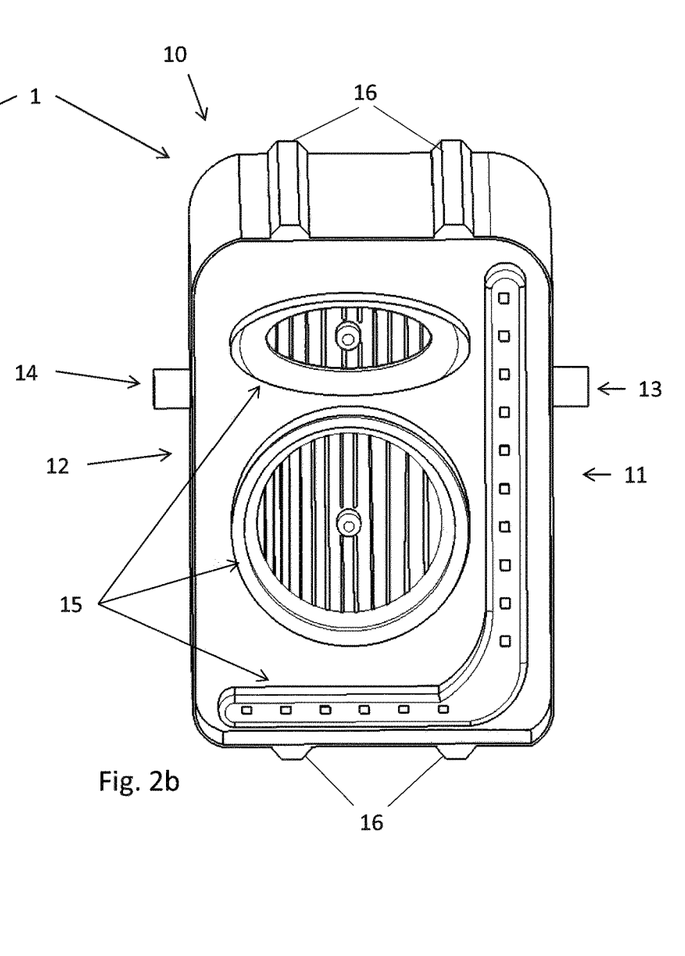
Figure 3:
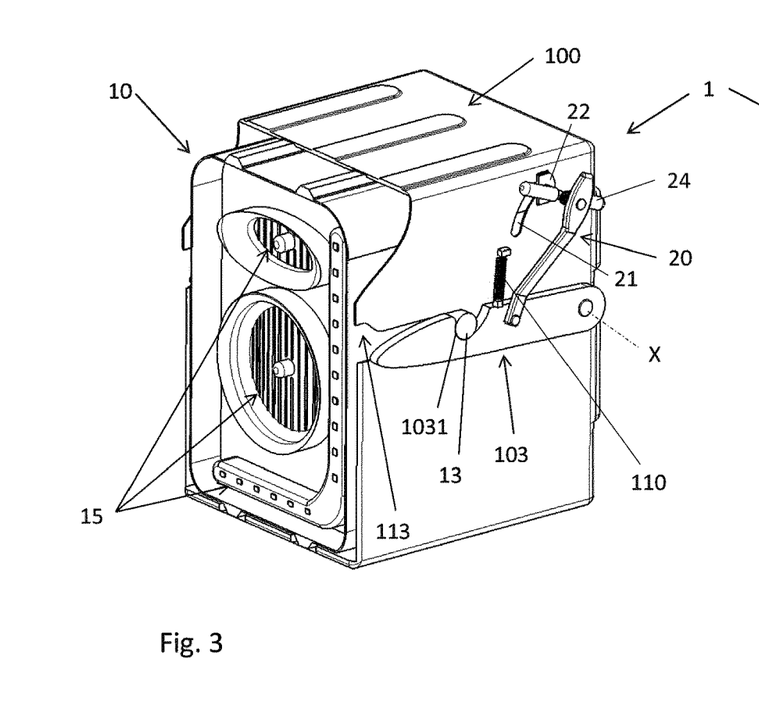
FIG. 3 shows an example embodiment of a lamp arrangement according to the second aspect of the present invention.
Figure 4:
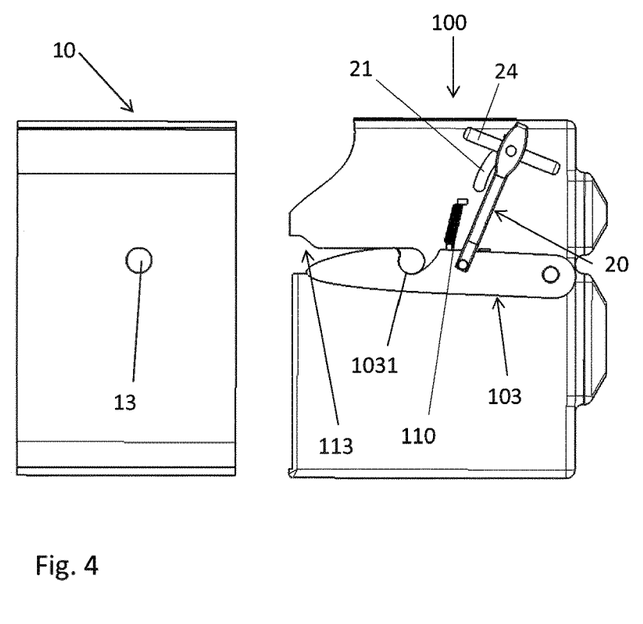
FIG. 4 shows a side view of a lamp unit and a lamp unit housing according to an embodiment of the present invention.

FIG. 2a shows a perspective view of a lamp unit housing 100 according to an example embodiment of the present invention. FIG. 2b shows a perspective view of a lamp unit 10 according to an example embodiment of the present invention. Hence, FIGS. 2a and 2b together show a lamp arrangement 1 according to an example embodiment of the present invention. FIG. 3 shows the lamp unit housing 100 and the lamp unit 10 when the lamp unit 10 is mounted to the lamp unit housing 100. FIG. 4 shows a side view of the lamp unit and the lamp unit housing 100 before the lamp unit has been mounted into the lamp unit housing 100.

With respect to e.g. FIG. 2a, a lamp unit housing 100 for a vehicle 2 is shown. The lamp unit housing 100 is adapted to receive and lock a lamp unit 10, see e.g. FIG. 2b, in a housing space of the lamp unit housing 100. The lamp unit housing comprises a first interior surface 101 and a second interior surface 102 which at least partly defines the housing space, and wherein the first and second interior surfaces 101, 102 are facing each other inside the housing space. The first and second interior surfaces 101, 102 are here part of vertically extending walls of the lamp unit housing 100, as seen when the lamp unit housing 100 is mounted on the vehicle 2. The lamp unit housing 100 further comprises a first clamping means 103 and a second clamping means 104, wherein the first clamping means 103 is provided proximate the first interior surface 101 and the second clamping means 104 is provided proximate the second interior surface 102, and wherein each one of the first and second clamping means 103, 104 is moveable between an unlocking position for unlocking the lamp unit 10 from the lamp unit housing 100 and a locking position for locking the lamp unit 10 to the lamp unit housing 100. The clamping means 103, 104 are here in the form of clamping arms provided on the outside of the housing space. The clamping arms 103, 104 are pivotable between the locking and unlocking position about an axle X which extends between the first and second interior surfaces 101, 102. The axle X may be defined as a normal with respect to a sectional plane defined by one of the interior surfaces 101, 102.

The lamp unit 10 as shown in e.g. FIG. 2b comprises means for emitting light 15, and also a first exterior surface 11 and a second exterior surface 12 facing away from each other. The first interior surface 101 and the first exterior surface 11 are adapted to face each other when the lamp unit 10 is mounted in the housing space and the second interior surface 102 and the second exterior surface 12 are adapted to face each other when the lamp unit 10 is mounted in the housing space. The first exterior surface 11 comprises a first locking means 13 which is adapted to be locked to the housing by the first clamping means 103 when the first clamping means 103 is in its locking position and the second exterior surface 12 comprises a second locking means 14 which is adapted to be locked to the housing by the second clamping means 104 when the second clamping means 104 is in its locking position. The first and second locking means 13, 14 are here provided as respective protruding portions which are adapted to be received in corresponding recesses on the first and second clamping arms 103, 104 so that the lamp unit 10 is locked to the lamp unit housing 100. In the shown embodiment, the recess 1031 on the first clamping arm 103 is shown. The second clamping arm 104 preferably comprises a similar recess (not shown). Further, the lamp unit housing 100 comprises recesses 113, 114 in which the protruding portions 13, 14 can be inserted into when the lamp unit is mounted to the lamp unit housing 100 and removed from when the lamp unit 10 is removed from the lamp unit housing 100. The recesses are provided on the respective vertical walls defining the first and second interior surfaces 101, 102. When the lamp unit is mounted into the housing space, the clamping arms 103, 104 will be pushed downwardly by the protruding portions 13, 14, until the protruding portions 13, 14 reach the recesses 1031 of the first and second clamping arms 103, 104. When the recesses 1031 are reached, a biasing member 110 will force the clamping arms 103, 104 to move upwards to the locking position, thereby locking the protruding portions 13, 14 in the recesses 1031.

The lamp unit housing 100 further comprises a synchronization member 111 which connects the first and the second clamping means 103, 104. The synchronization member 111 synchronizes the movement of the first and the second clamping means 103, 104 between the unlocking position and the locking position, i.e. in this embodiment it synchronizes the pivotable movement of the clamping arms 103, 104 about the axle X. The synchronization member 111 is here in the form of a bar which extends in the direction of the axle X between the clamping arms 103, 104. As can be further seen in e.g. FIG. 2a, the synchronization member 111 extends inside the housing space proximate a bottom interior surface 105 of the lamp unit housing 100. It shall be noted that the synchronization member 111 of course may be configured differently, and may for example alternatively extend between the first and second clamping means 103, 104 on the other side of the bottom interior surface 105. It shall also in this respect be noted that the lamp unit housing 100 does not necessarily require a bottom interior surface 105, but could also be open, or at least partially open, at its bottom.

As further shown in e.g. FIG. 2a, each one of the first and second clamping means 103, 104 is biased towards the locking position by a biasing member 110. The biasing member 110 is here a coil spring attached to the first clamping means 103 and the lamp unit housing 100. Due to the synchronization member 111, only one biasing member 110 is required for biasing both clamping means 103, 104 towards the locking position. The biasing member 110 allows the lamp unit 10 to be easily locked to the lamp unit housing 100, i.e. in a plug and play manner. As an alternative, also another biasing member, e.g. in the form of a coil spring, may be attached to the second clamping means 104 in a similar manner as the biasing member 110.

Further, as e.g. shown in FIG. 2a, the bottom interior surface 105 may comprise one or more push biasing members 106 which is/are adapted to provide a pressing force onto the lamp unit 10 when it is mounted in the housing space and locked to the lamp unit housing 100 by the first and the second clamping means 103, 104. Thereby the lamp unit may more easily be released from the lamp unit housing 100 during dismounting. In the shown embodiments, there are four push biasing members 106 provided on the bottom interior surface 105, even though any number of such members may be used. A more detailed perspective view of a push biasing member 106 is shown in FIG. 6c, which in the shown embodiment is a spring-biased pin.

Figure 5A:
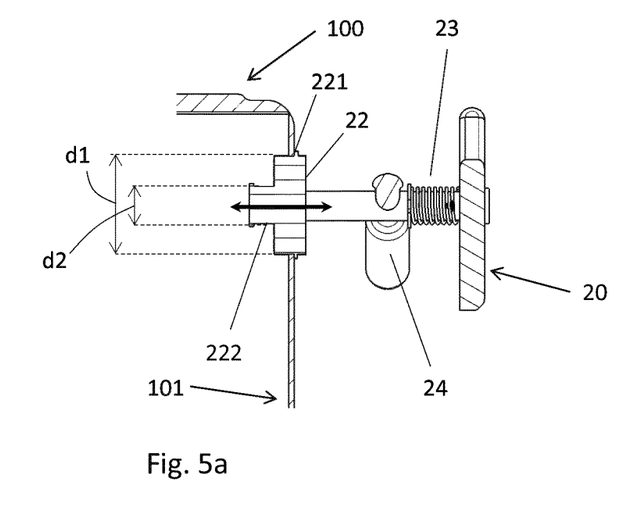
FIGS. 5a and 5b show a detailed view of a clamping means moving member according to an example embodiment of the present invention.
Figure 5B:
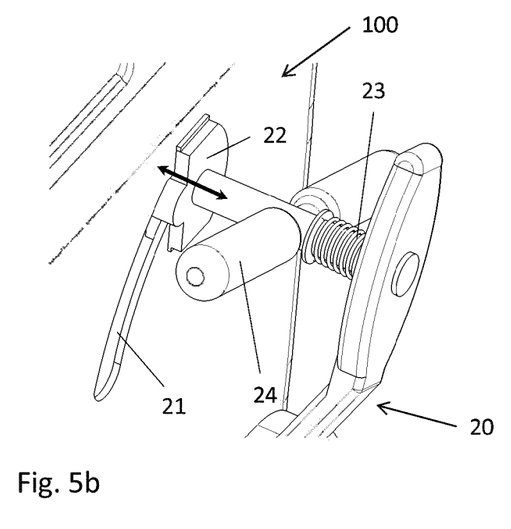

Further, as shown in e.g. FIG. 2a and in further detail in FIGS. 5a and 5b, the lamp unit housing 100 may further comprise a clamping means moving member 20 which is connected to at least one of the first and the second clamping means 103, 104. In the shown embodiments, the clamping means moving member 20 is connected to the first clamping means 103. The clamping means moving member 20 is adapted to move the first and the second clamping means 103, 104 between the unlocking position and the locking position. In the shown embodiment, the clamping means moving member 20 is adapted to pivotally move the clamping arms 103, 104 about the axis X. The clamping means moving member 20 is further adapted to be manually actuated by a user, by e.g. gripping on a gripping means 24. The clamping means moving member 20 as shown is in the form of an arm and is further provided outside the housing space proximate the first interior surface 101. The lamp unit housing 100 further comprises a guide 21, which here is a slot, which at least a portion 22 of the clamping means moving member is adapted to be connected to and slide in when it moves the first and the second clamping means 103, 104 between the unlocking position and the locking position. More particularly, in the shown embodiment, the clamping means moving member 20 can move in and follow a predetermined path, i.e. the path of the guide 21, in a repeated manner between the locking and unlocking position.

The guide 21 extends between a proximal end and a distal end, wherein the proximal end is located proximate the first clamping means 103 and the distal end is located distal from the first clamping means 103, whereby the portion 22 of the clamping means moving member 20 is adapted to be movable at the distal end of the guide 21 between a first position where the clamping means moving member 20 locks the first and the second clamping means 103, 104 into the locking position and a second position where the clamping means moving member is freely moveable in the guide.

The portion 22 is in FIGS. 5a and 5b shown when it is in its first position. In the first position, the portion 22 is locked to the lamp unit housing 100. When the portion 22 is located at the distal end of the guide 21, it can be moved from its second position to the first position in a direction which is substantially parallel to the X-axis, indicated by the arrows in FIGS. 5a and 5b. The distal end of the guide 21 is having an enlarged area. The portion 22 has a stepped surface, as seen in a cross sectional view of the lamp unit housing 100 as shown in FIG. 5a, which cross sectional view is defined by a sectional plane being substantially perpendicular to the mounting/dismounting direction of the lamp unit 10. The stepped surface comprises a first peripheral surface 221 and a second peripheral surface 222, wherein a diameter d1 of the first peripheral surface 221 is larger than a diameter d2 of the second peripheral surface 222. The diameter d1 is adapted so that the surface 221 fits into the enlarged area at the distal end of the guide 21, and thereby locks the portion 22 so that the clamping means moving member cannot be moved in the guide 21. The diameter d2 is adapted so that the surface 222 fits in the guide 21 and so that the portion 22 can be freely moved between the distal end and the proximal end. The portion 22 is further biased towards its first position by a second biasing member 23, which here is a coil spring. A user may push/pull in the gripping means 24 so that the portion is moved to its second position. Thereafter, the user may actuate the clamping means moving member 20 so that the clamping means 103, 104 are pivoted about the X-axis, thereby releasing the lamp unit 10 so that it can be pulled out from the housing space.

The lamp unit housing 100 may further comprise a fourth 107 and a fifth 108 interior surface which further defines the housing space. The fourth and fifth interior surfaces 107, 108 face each other and extend between the respective first and second interior surfaces 101, 102, thereby forming two horizontally extending surfaces, as seen when the lamp unit housing 100 is mounted on the vehicle 2. The fourth and fifth interior surfaces 107, 108 comprises lamp unit guides 109 into which the lamp unit can slide when it is mounted into and released out from the housing space. Hence, the lamp unit 10 comprises corresponding guides 16 adapted to slide in the lamp unit guides 109. Thereby, the lamp unit 10 may more easily be inserted into and pulled out from the housing space, with a reduced risk of the lamp unit 10 getting stuck. Further, the one or more guides 109 may facilitate to position the lamp unit 10 correctly with respect to the housing space.

Figure 6A:
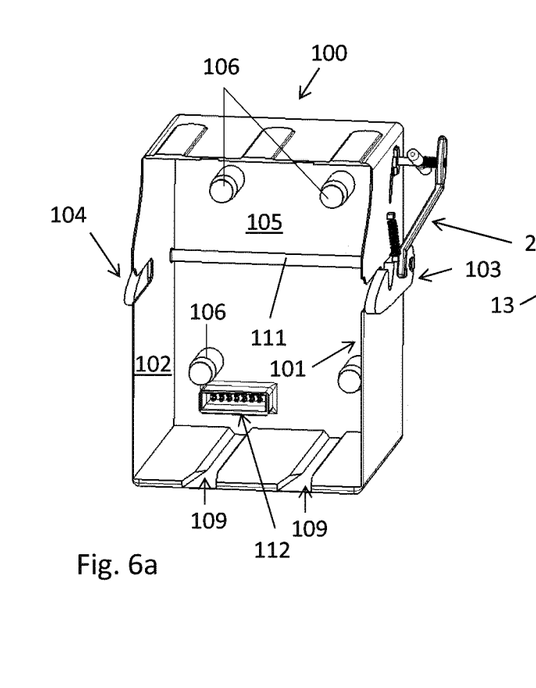
FIGS. 6a-c show other example embodiments of a lamp unit housing and a lamp unit according to the first and second aspects of the present invention.
Figure 6B:
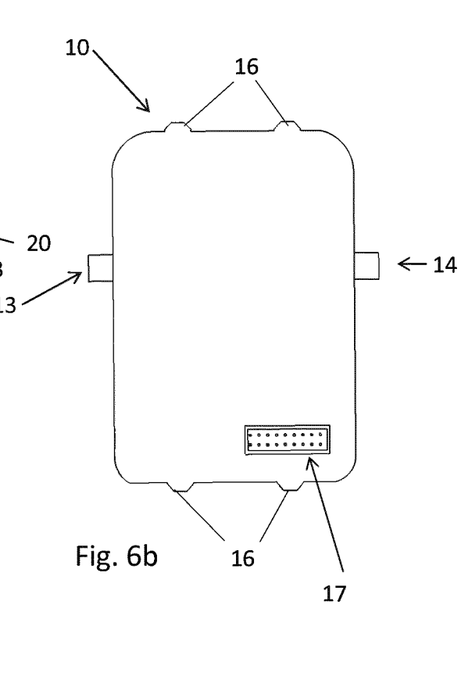
Figure 6C:
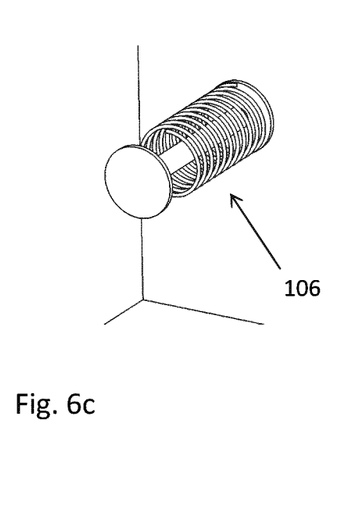

The lamp unit housing 100 may further comprise an electrical connection 112 for electrically connecting the lamp unit 10 to the lamp unit housing 100, see FIG. 6*a*. The electrical connection 112 is here provided on the bottom interior surface 105. Still further, the electrical connection 112 is configured so that it will automatically connect with a corresponding electrical connection 17 on the lamp unit 10 when the lamp unit 10 is provided into its locked position in the lamp unit housing 100. The electrical connection 17 on the lamp unit 10 is shown in FIG. 6*b*, which shows a rearward view of the lamp unit 10. Alternatively, or complementary, as also mentioned in the above, the lamp unit 10 may comprise wireless power transfer and/or wireless communication means (not shown).

It is to be understood that the present invention is not limited to the embodiments described above and illustrated in the drawings; rather, the skilled person will recognize that many changes and modifications may be made within the scope of the appended claims.

The invention claimed is:

1. A lamp unit housing for a vehicle, the lamp unit housing being adapted to receive and lock a lamp unit in a housing space of the lamp unit housing, the lamp unit housing comprising: a first interior surface and a second interior surface at least partly defining the housing space, wherein the first and second interior surfaces are facing each other inside the housing space, a first clamping means and a second clamping means, wherein the first clamping means is provided proximate the first interior surface and the second clamping means is provided proximate the second interior surface, and wherein each one of the first and second clamping means is moveable between an unlocking position for unlocking the lamp unit from the lamp unit housing and a locking position for locking the lamp unit to the lamp unit housing, a synchronization member connecting the first and the second clamping means, whereby the synchronization member synchronizes the movement of the first and the second clamping means between the unlocking position and the locking position, the lamp unit housing further comprising a clamping means moving member which is connected to at least one of the first and the second clamping means, wherein the clamping means moving member is adapted to move the first and the second clamping means between the unlocking position and the locking position, wherein the clamping means moving member is provided outside the housing space proximate the first interior surface and is connected to the first clamping means, wherein the lamp unit housing further comprises a guide which at least a portion of the clamping means moving member is adapted to be connected to and slide in when it moves the first and the second clamping means between the unlocking position and the locking position, wherein, the guide extends between a proximal end and a distal end, wherein the proximal end is located proximate the first clamping means and the distal end is located distal from the first clamping means, whereby the portion of the clamping means moving member is adapted to be movable at the distal end of the guide between a first position where the clamping means moving member locks the first and the second clamping means into the locking position and a second position where the clamping means moving member is freely moveable in the guide.

2. The lamp unit housing according to claim 1, wherein each one of the first and second clamping means is further biased towards the locking position by at least one biasing member.

3. The lamp unit housing according to claim 1, further comprising a bottom interior surface further defining the housing space and facing an opening of the housing space.

4. The lamp unit housing according to claim 3, wherein the synchronization member extends between the first and the second interior surface inside the housing space and proximate the bottom interior surface.

5. The lamp unit housing according to claim 3, wherein the bottom interior surface comprises one or more push biasing member/s which is/are adapted to provide a pressing force onto the lamp unit when it is mounted in the housing space and locked to the lamp unit housing by the first and the second clamping means.

6. The lamp unit housing according to claim 1, wherein the portion of the clamping means moving member is biased towards its first position by a second biasing member.

7. The lamp unit housing according to claim 1, further comprising a fourth and a fifth interior surface further defining the housing space, facing each other and extending between the respective first and second interior surface, wherein at least one of the fourth and fifth interior surfaces comprises one or more lamp unit guide/s into which the lamp unit can slide when it is mounted into and released out from the housing space.

8. The lamp unit housing according to claim 3, further comprising an electrical connection or electrically connecting the lamp unit to the lamp unit housing, wherein the electrical connection is provided on the bottom interior surface.

9. A lamp arrangement comprising the lamp unit housing according to claim 1 and a lamp unit comprising means for emitting light, the lamp unit comprising a first exterior surface and a second exterior surface facing away from each other, wherein the first interior surface and the first exterior surface are adapted to face each other when the lamp unit is mounted in the housing space and wherein the second interior surface and the second exterior surface are adapted to face each other when the lamp unit is mounted in the housing space, wherein the first exterior surface comprises a first locking means being adapted to be locked to the housing by the first clamping means when the first clamping means is in its locking position and wherein the second exterior surface comprises a second locking means being adapted to be locked to the housing by the second clamping means when the second clamping means is in its locking position.

10. The lamp arrangement according to claim 9, further comprising at least one of means for wireless power transfer or wireless communication for the lamp unit.

11. The lamp arrangement according to claim 9, wherein the lamp arrangement is a headlamp arrangement for illuminating a road ahead of the vehicle when in use.

12. A vehicle comprising the lamp unit housing according to claim 1 or the lamp arrangement.

* * * * *